Nov. 2, 1937.            J. F. GAMBLE            2,098,091
BATTERY TERMINAL PROTECTOR
Filed Feb. 24, 1936
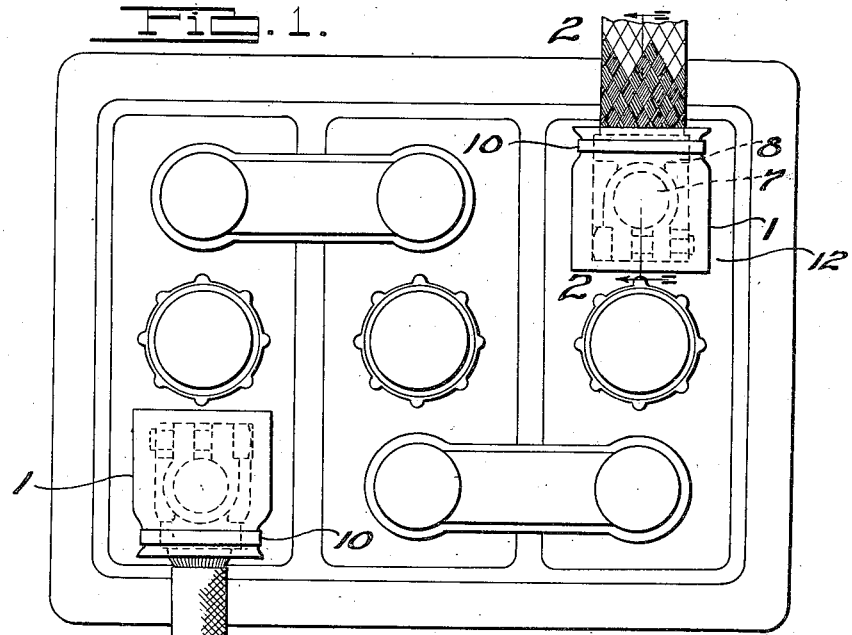
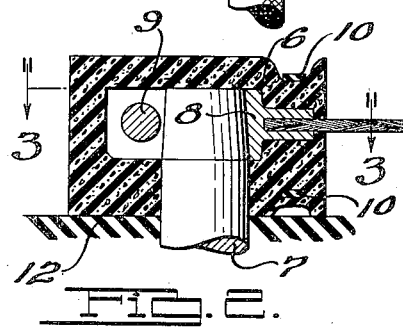
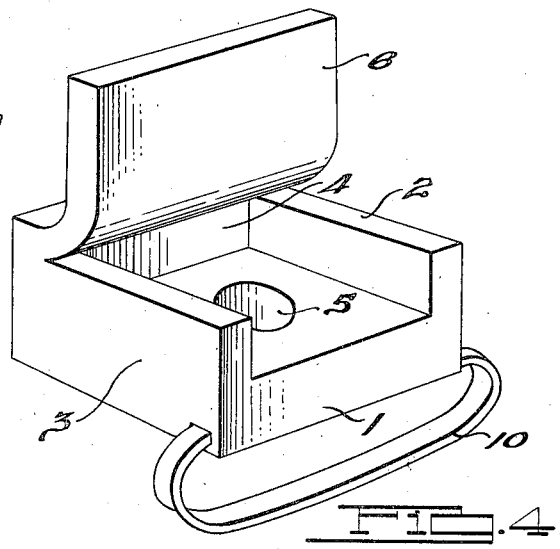
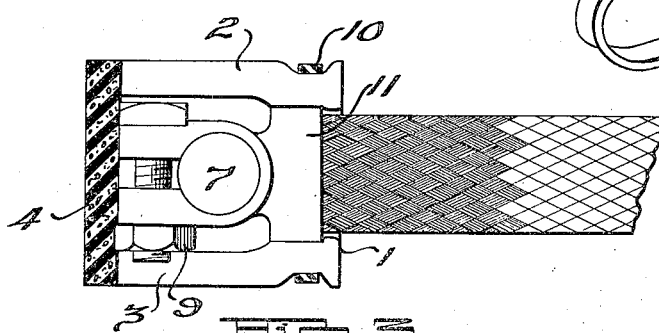
INVENTOR
John F. Gamble.
BY
ATTORNEY Patented Nov. 2, 1937

2,098,091

UNITED STATES PATENT OFFICE 2,098,091

BATTERY TERMINAL PROTECTOR

John F. Gamble, Detroit, Mich.

Application February 24, 1936, Serial No. 65,240

4 Claims. (Cl. 173—259)

This invention relates to battery terminal protectors and the object of the invention is to provide a protector for a battery terminal and clamp arranged to enclose the same and prevent corrosion from accumulating on and eating away the parts.

Another object of the invention is to provide an absorbent cover for the battery terminal clamp and battery terminal arranged to be saturated with, "Vaseline", grease or other protecting material and fitting over the parts to seal the same and prevent accumulation of corrosion or other foreign matter thereon.

A further object of the invention is to provide a battery terminal protector formed from absorbent material such as sponge rubber or the like and provided with a chamber to receive the battery terminal clamp and having an aperture opening into said chamber through which the battery terminal may extend into said chamber.

Another object of the invention is to provide a battery terminal protector which will not interfere with the application or removal of the battery terminal clamp and which encloses and protects all the parts of the clamp and battery terminal.

These objects and the several novel features of the invention are hereinafter more fully described and claimed and the preferred form of construction by which these objects are attained is shown in the accompanying drawing in which—

Fig. 1 is a plan view of a storage battery equipped with my improved battery terminal protectors.

Fig. 2 is an enlarged section taken on line 2—2 of Fig. 1.

Fig. 3 is a section taken on line 3—3 of Fig. 2.

Fig. 4 is a perspective view of the protector alone.

The protector is shown more particularly in Fig. 4 and may be formed of sponge rubber, pressed felt or any other suitable absorbent and semi-flexible material. In the form shown in the drawing the material indicated is sponge rubber and comprises a bottom portion 1 having side walls 2 and 3 and an end wall 4. This bottom portion 1 is provided with an aperture 5 therethrough for the battery terminal and an integral cover 6 is formed by cutting the material through at the top of the side walls 2 and 3 as shown in Figs. 3 and 4.

The device is applied by fitting the opening 5 in the protector over the battery terminal 7 shown in Fig. 2 so that the upper end of the battery terminal extends into the chamber formed by the walls 2, 3, and 4. The cover 6 is then turned back to allow the battery terminal clamp 8 to be fitted over the upper end of the battery terminal within the protector. This clamp may be tightened by turning up the nut 9 of the battery terminal clamp. As the protector is formed of flexible material, it will allow a wrench or pliers to be applied to the nut 9 due to the fact that the flexible material may be pressed away from the nut during this tightening operation.

After the battery terminal clamp has been tightened, the chamber between the walls 2, 3 and 4 may be filled with grease, "Vaseline", or other material tending to prevent corrosion and before the protector is applied to the battery terminal it is preferably saturated in grease or, "Vaseline", so that the pores of the sponge rubber are filled with the protecting material. After the chamber has been filled with grease or, "Vaseline", the cover 6 may be turned down over the top of the battery terminal and battery terminal clamp and a rubber band 10 is applied about the edge of the protector to draw the sponge rubber parts in to tightly fit about the cable connection 11. This rubber band is preferably attached to the bottom portion 1 of the protector as suggested in Figs. 2 and 4 so as not to become lost and when fitted about the end of the protector will draw the sponge rubber protector in tightly to seal the battery terminal clamp and terminal. This seals the battery terminal clamp and terminal from the air and from the gases arising from the battery cells and as the portion 1 of the protector fits firmly against the top 12 of the battery, any liquid spilled on the top of the battery is prevented from coming into contact with the terminal 7 by the protector which fits closely about the battery terminal and closely to the top of the battery itself.

To remove the clamp from the battery terminal, it is only necessary to disengage the rubber band 10 and turn back the cover 6, at which time, the nut 9 may be loosened to allow removal of the battery terminal clamp and thus the device interferes in no way with the connection or disconnection of the battery in a circuit.

When the protector is formed of pressed felt or other absorbent material, it may be used in the same manner and it is desirous that the opening 5 in the protector into which the battery terminal fits engages the terminal tightly and firmly to prevent corrosion accumulating on the surface of the battery terminal. The device may be quickly and easily installed on any battery and may be removed and replaced without difficulty. Due to the fact that the chamber in the protector is filled with grease or "Vaseline", and the protector is saturated in "Vaseline", the battery terminal clamp bolt is always well lubricated and will allow the nut 9 to be easily threaded or unthreaded on the bolt.

From the foregoing description it becomes evident that the device is very simple and efficient in operation, may be very easily installed or removed, will maintain the battery terminal and clamp in a protective covering of grease at all times and provides a device which accomplishes the objects described.

Having thus fully described my invention, its utility and mode of operation, what I claim and desire to secure by Letters Patent of the United States is—

1. A protector for a battery terminal and battery terminal clamp comprising an absorbent member saturated with corrosion resistant material, said member being arranged to be fitted about the battery terminal and being provided with a chamber therein for the battery terminal clamp, said chamber being arranged to be filled with corrosion resistant material, a cover for said chamber of absorbent material saturated with corrosion resistant material and an elastic band fitted about the said member and compressing the same to prevent leakage of corrosion resistant material from the chamber.

2. A protector for a battery terminal and clamp having a lead-in wire connected therewith, comprising a preformed member of flexible and absorbent material saturated with a corrosion resistant element having a chamber therein provided with an opening through the bottom for engaging over the terminal and an opening at one edge, the top being connected with the body at the edge opposite that having the opening and providing a flap that may be raised to permit introduction of the clamp end to the terminal, the said edge of the body having the side opening extending over a clamp portion, and releasable means for compressing the flap and opposed body portion about the clamp and lead-in wire connected therewith.

3. A protector for a battery terminal and clamp having a lead-in wire connected therewith, comprising a preformed member of flexible and absorbent material having a chamber of substantially rectangular form in plan, there being an opening through the bottom of the protector to permit introduction of the same over the terminal with the clamp receiving end of the terminal located in the chamber, said body having an opening in one side and a cover comprising a flap portion in integral relation with the opposite side of the body and unattached to the remaining walls of the chamber permitting the flap to be turned upwardly to open the chamber and permit the positioning of the clamp end on or the removal thereof from the terminal, and a flexible and elastic band attached to the body at adjacent the side having the opening and providing a means to engage over the flap to draw the body and flap end about the clamp and portion of the lead-in wire extending therefrom.

4. A protector for a battery terminal and clamp element having a lead-in wire comprising a sponge rubber member preformed to provide a chamber therein having an aperture in the bottom and an integral cover member extending over the chamber and free from the peripheral walls except at one side, the opposite side wall of the chamber having a notch therein opening through its upper edge whereby, in placing the device on the battery terminal to position with the terminal within the member, the clamp, when the flap is turned outwardly, may be passed into the chamber through the top and over the terminal with the lead-in wire extending through the said notch in the side wall, and means for securing the device in place comprising a member for clamping the cover and the body portions about the clamp and attached portion of the lead-in wire.

JOHN F. GAMBLE.